2,825,720

VULCANIZATION OF BUTYL RUBBER BY 2,6-DI-(ACYLOXYMETHYL)-4-HYDROCARBYL PHENYL ACYLATES

Pliny O. Tawney, Passaic, N. J., assignor to United States Rubber Company, New York, N. Y., a corporation of New Jersey No Drawing. Application September 27, 1955
Serial No. 537,045

4 Claims. (Cl. 260—85.3)

This invention relates to a new method of vulcanizing Butyl rubber by means of (A) certain organic compounds in conjunction with (B) heavy metal halides, and also to improved Butyl rubber vulcanizates made with such compounds.

According to the invention, Butyl rubber is vulcanized by heating with (A) a 2,6-di(acyloxymethyl)-4-hydrocarbylphenyl acylate of the formula

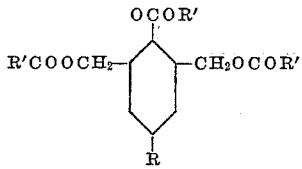

wherein R is a hydrocarbon radical (e. g., an alkyl, aryl, aralkyl or cycloalkyl radical) and R' is an alkyl radical, preferably a lower alkyl radical containing 8 carbon atoms or less, and (B) a heavy metal halide. The resulting vulcanizates have remarkable resistance to oxidation and to exposure to elevated temperatures, and they have other desirable physical properties. It was surprising to find that the stated organic compounds, in the presence of heavy metal halides, will produce such improved Butyl rubber vulcanizates, because the described organic compounds will not vulcanize Butyl rubber in the absence of the heavy metal halide.

Butyl rubber, or GR-I, is a generic name for any of the well known synthetic rubbery copolymers of an isoolefin with a minor amount of a conjugated diolefin. The isoolefins used generally have from 4 to 7 carbon atoms, and such isomonoolefins as isobutylene and 2-methyl-2-butene are preferred. The diolefins used have from 4 to 8 carbon atoms. Isoprene and butadiene are the most important of these diolefins; others are piperylene; 2,3-dimethylbutadiene; 3-methyl-1,3-pentadiene; 2-methyl-1,3-pentadiene; 1,3-hexadiene and 2,4-hexadiene. The Butyl rubber typically contains from about 0.5 to 5%, and seldom more than 10%, of copolymerized diolefin on the total weight of the elastomer. This relatively small amount of unsaturation renders the behavior of Butyl rubber toward vulcanizing agents fundamentally different from the behavior of the more highly unsaturated rubbers, such as natural rubber or GR-S, and therefore experience with such highly unsaturated rubbers affords no basis for predicting the behavior of Butyl rubber toward a given vulcanizing agent.

Typical specific compounds of the above formula employed in the invention are 2,6-(acetoxymethyl)-4-methylphenyl acetate; 2,6-di(acetoxymethyl)-4-ethylphenyl acetate; 2,6-di(acetoxymethyl)-4-isopropylphenyl acetate; 2,6-di(acetoxymethyl)-4-tert-butylphenyl acetate; 2,6-di(acetoxymethyl)-4-tert,tert-octylphenyl acetate; 2,6-di(acetoxymethyl)-4-dodecylphenyl acetate; 2,6-di(acetoxymethyl)-4-phenylphenyl acetate; 2,6-di(acetoxymethyl)-4-benzylphenyl acetate; 2,6-di(acetoxymethyl)-4-cyclohexylphenyl acetate; 2,6-di(propionoxymethyl)-4-tert-butylphenyl propionate; 2,6-di(butyroxymethyl)-4-tert-butylphenyl butyrate; 2,6-di(isobutyroxymethyl)-4-tert-butylphenyl isobutyrate; and 2,6-di(capryloxymethyl)-4-tert-butylphenyl coprylate.

The amount of the organic vulcanizing agent of the stated formula employed in the invention usually ranges from about 2 parts (by weight) to about 12 parts per 100 parts of the Butyl rubber. In general, a preferred range of the organic curing agent is from about 4 parts to 8 parts per 100 of the rubber.

The heavy metal halide—which may be regarded as a kind of catalyst or activator or curing supplement, since the organic compound itself will not cure the Butyl rubber—is usually used in amount of at least 0.5 part, and I preferably use about 1 to 3 parts, per 100 parts of the Butyl rubber. Although in some cases even larger amounts of the metal halide can be used, say 10 parts, it is not generally necessary or desirable to use appreciably more than about 5 parts. In the majority of cases I limit the heavy metal halide to 5 parts or less, and I may even limit it to 1 or 2 parts at times. I customarily use a large amount of the heavy metal halide, e. g., from 5 to 10 parts, when I wish to cure the Butyl very rapidly at a low temperature, e. g., 100° C.

The heavy metal halides employed are exemplified by such known stable acidic halides as tin chloride, zinc chloride, iron chloride, and, in general, halides of the various metals usually classified as heavy metals (cf. the periodic chart of the elements in "Introductory College Chemistry" by H. G. Deming, published by John Wiley and Sons, Inc.). This class includes, inter alia, chromium chloride and nickel chloride, as well as cobalt chloride, manganese chloride and copper chloride. Although the copper halides may be used, I prefer not to use them because of the possible deleterious effect of the copper on the Butyl rubber. The heavy metal chlorides constitute the preferred class of activators or vulcanization adjuvants, although the heavy metal salts of other halides including bromine, fluorine, and iodine (such as stannic iodide) may also be used. Of the heavy metal chlorides, the most preferred are those of tin, iron and zinc. The heavy metal halides are effective independently of the state of oxidation of the metal, and they are even effective if the halide is partially hydrolyzed, or is only a partial halide, as in zinc oxychloride.

In carrying out the invention, the Butyl rubber, the organic vulcanizing agent, and heavy metal halide, and any additional desired ingredients, may be mixed together in any desired order according to the procedures ordinarily used in mixing rubber compounds, with the aid of the usual rubber mixing equipment, such as an internal mixer or roll mill.

The vulcanizable mixture resulting from the foregoing ingredients may be fabricated into the desired form by the usual methods, such as calendering, extrusion, or molding, and subsequently vulcanized by heating, preferably while confined under pressure.

Preferably carbon black is present in the products made by the process of this invention. As is well known, carbon black greatly improves the tensile strength, abrasion resistance and other properties of sulfur-cured Butyl rubber as compared to the respective properties of similarly cured gum Butyl rubber. This improvement likewise is conferred by carbon black on Butyl rubber which is cured by the method of this invention. However, for certain products this improved tensile strength, etc., is not needed. Therefore, in its broadest aspect this invention relates to the cure of gum Butyl rubber and to Butyl rubber and to Butyl rubber which contains other fillers, e. g., clays, titanium dioxide, etc., as well as to black-filled Butyl rubber.

The cure is conveniently carried out at temperatures of 100° C. or more, and preferably at temperatures in excess of 150° C., for periods of time ranging from about 5 minutes to 3 hours, the longer periods of time within the stated time range being employed with the lower temperature. The most preferred curing temperatures are within the range of about 160° C. to 190° C., although somewhat higher temperatures may be employed, e. g., 200° to 205° C., provided that such high temperatures are not maintained long enough to cause thermal injury to the article. The time and temperature chosen for a particular cure not only are related inversely to each other but also are dependent on the amount of catalyst used. Therefore, the time and temperature of cure can be given only in the broad ranges shown above. Any skilled rubber compounder can easily determine conventionally the proper curing conditions for any particular stock.

The process of this invention is useful in making cured Butyl rubber products which resist aging at high temperatures in steam and/or air extremely well. Typical products are curing bags, steam hose, gaskets for equipment which must remain at high temperatures continuously or intermittently for long periods of time, belts, inner tubes, tires, motor mountings, flexible hot air ducts, hot water bottles, etc. The cured products may also be kept in contact with copper or silver articles, which would be tarnished by Butyl rubber products cured by, or containing, sulfur.

The vulcanizing agents used in this invention are easily made by esterifying an appropriate 2,6-dimethylol-4-hydrocarbylphenol with the anhydride of the appropriate fatty acid. This method is described in detail by Barthel, J. prakt. Chem. 161, 77–80 (1942), and used by him to make one of the said vulcanizing agents—2,6-di(acetoxymethyl)-4-methylphenyl acetate. This ester is distillable in vacuo, but in general the esters used in this invention are distillable only with difficulty. Thus, 2,6-di(acetoxymethyl)-4-tert-butylphenyl acetate is a viscous, almost colorless oil obtained as a residue from evaporation, in high vacuo, of the excess acetic anhydride and the acetic acid formed in the esterification. The physical properties of the residue agree with those calculated for $C_{18}H_{24}O_6$. It will be understood that any and all of the vulcanizing agents employed in the invention may be prepared by the foregoing procedure, starting with appropriate corresponding known materials.

The following example illustrates this invention. All parts are by weight.

*Example*

A masterbatch was mixed on a rubber mill in the proportion of 100 parts of GR-I 15 (a copolymer of isobutylene: isoprene, 98:2, according to Rubber Age, 74, 561 (1954)), 50 parts of carbon black, 2 parts of stearic acid and 5 parts of Indopol H300 (a commercially available polybutene sold as a plasticizer for rubbers). Stannous chloride dihydrate and 2,6-di(acetoxymethyl)-4-tert-butylphenyl acetate were then mixed with individual portions of the masterbatch on the mill to form a series of stocks which differed among themselves only in the amount of the curing agent. Portions of these stocks were cured in 6" x 6" x 0.1" molds under pressure at 161° C. (322° F.) for the individual times shown. The stocks then were tested conventionally, as shown, to determine the extent of cure and resistance to aging.

| Stock | | 1 | 2 | 3 | 4 | 5 |
|---|---|---|---|---|---|---|
| Masterbatch | | 157 | 157 | 157 | 157 | 157 |
| SnCl₂, 2H₂O | | 1.8 | 1.8 | 1.8 | 1.8 | 1.8 |
| 2,6-Di(acetoxymethyl)-4-tert-butyl-phenyl acetate | | 2 | 4 | 6 | 8 | 12 |
| Green Tests: | Cure (min.) | | | | | |
| Tensile Strength (p. s. i.) | 15 | | | 600 | 510 | 1,040 |
|  | 30 | 210 | 670 | 1,450 | 1,270 | 1,560 |
|  | 60 | 850 | 1,540 | 1,460 | 1,480 | 1,460 |
|  | 120 | 1,420 | 1,470 | 1,430 | 1,340 | 1,400 |
| Elongation (percent) | 15 | | | 660 | 720 | 580 |
|  | 30 | 750 | 660 | 400 | 440 | 410 |
|  | 60 | 580 | 400 | 220 | 280 | 230 |
|  | 120 | 390 | 210 | 150 | 160 | 160 |
| 100 percent Modulus (p. s. i.) | 15 | | | 100 | 80 | 130 |
|  | 30 | 110 | 210 | 210 | 180 | 210 |
|  | 60 | 130 | 230 | 380 | 310 | 390 |
|  | 120 | 190 | 430 | 700 | 570 | 610 |
| Aging Tests (60-minute cures): | | | | | | |
| Tensile Strengths (p. s. i.)— | | | | | | |
| green | | 850 | 1,540 | 1,460 | 1,480 | 1,460 |
| aged 3 days in steam [a] | | 1,140 | 1,160 | 1,050 | 1,070 | 1,130 |
| aged 24 hrs. in air [b] | | 1,070 | 1,350 | 1,260 | 1,260 | 1,140 |
| aged 48 hrs. in air | | 830 | 1,180 | 1,330 | 1,090 | 1,060 |
| Elongation (percent)— | | | | | | |
| green | | 580 | 400 | 220 | 280 | 230 |
| aged 3 days in steam | | 350 | 190 | 130 | 150 | 120 |
| aged 24 hrs. in air | | 350 | 190 | 120 | 110 | 70 |
| aged 48 hrs. in air | | 380 | 230 | 140 | 100 | 90 |
| 100 percent Modulus (p. s. i.)— | | | | | | |
| green | | 130 | 230 | 380 | 310 | 390 |
| aged 3 days in steam | | 200 | 370 | 640 | 510 | 660 |
| aged 24 hrs. in air | | 190 | 410 | 790 | 1,000 | |
| aged 48 hrs. in air | | 160 | 410 | 740 | 900 | |

[a] All steam aging tests were made at 164° C. (85 p. s. i. of steam.)
[b] All air aging tests were made at 177° C. with air circulating throughout the test.

This example shows that 2,6-di(acetoxymethyl)-4-tert-butylphenyl acetate is a good curing agent for Butyl rubber, and that the cured stocks age extremely well.

Having thus described my invention, what I claim and desire to protect by Letters Patent is:

1. A method of vulcanizing a synthetic rubbery copolymer of an isoolefin having from 4 to 7 carbon atoms with from 0.5 to 10% of a conjugated diolefin having from 4 to 8 carbon atoms, comprising heating 100 parts by weight of the said rubber at a temperature of from 100° C. to 205° C. for from 5 minutes to 3 hours, in admixture with from 2 to 12 parts of (A) a compound of the formula

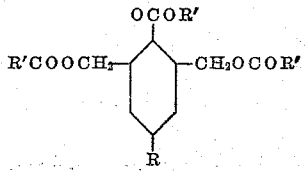

wherein R is a radical selected from the group consisting of alkyl, aryl, aralkyl and cycloalkyl radical and R' is a lower alkyl radical, and (B) from 0.5 to 10 parts of a heavy metal halide.

2. A method of vulcanizing a synthetic rubbery copolymer of isobutylene with from 0.5 to 10% of isoprene comprising heating 100 parts by weight of said rubber at a temperature of from 150° C. to 205° C. for from 5 minutes to 3 hours, in admixture with from 4 to 8 parts of 2,6-di(acetoxymethyl)-4-tert-butylphenyl acetate and from 1 to 5 parts of a heavy metal chloride.

3. An improved vulcanizate characterized by resistance to deterioration at elevated temperatures comprising 100 parts by weight of a synthetic rubbery copolymer of an isoolefin having from 4 to 7 carbon atoms with from 0.5 to 10% of a conjugated diolefin having from 4 to 8 carbon atoms, vulcanized with from 2 to 12 parts of (A) a compound of the formula

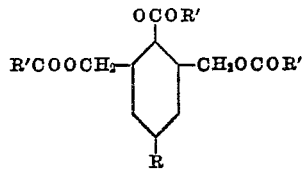

wherein R is a radical selected from the group consisting of alkyl, aryl, aralkyl and cycloalkyl radical and R' is a lower alkyl radical, and (B) from 0.5 to 10 parts of a heavy metal halide.

4. An improved vulcanizate characterized by resistance to oxidation at elevated temperatures comprising 100 parts by weight of a synthetic rubbery copolymer of isobutylene with from 0.5 to 10% of isoprene, vulcanized with from 4 to 8 parts of 2,6-di(acetoxymethyl)-4-tert-butylphenol acetate and from 1 to 5 parts of a heavy metal chloride.

References Cited in the file of this patent
UNITED STATES PATENTS
2,726,224     Peterson et al.    ----------- Dec. 6, 1955

OTHER REFERENCES
Van der Meer: Rubber Chem. Tech. 18, 853–873 (1945).

UNITED STATES PATENT OFFICE
CERTIFICATE OF CORRECTION

Patent No. 2,825,720                                    March 4, 1958

Pliny O. Tawney

It is hereby certified that error appears in the above numbered patent requiring correction and that the said Letters Patent should read as corrected below.

Column 1, lines 23 to 30, column 4, lines 69 to 75, and column 5, lines 19 to 25, the structural formula, each occurrence, should appear as shown below instead of as in the patent:

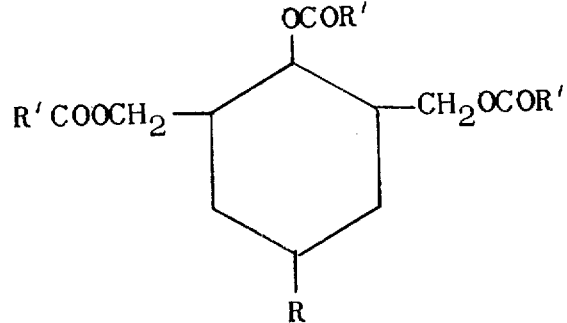

Signed and sealed this 22nd day of September 1964.

(SEAL)
Attest:

ERNEST W. SWIDER
Attesting Officer

EDWARD J. BRENNER
Commissioner of Patents